(12) United States Patent
Pignatelli

(10) Patent No.: US 10,216,625 B2
(45) Date of Patent: Feb. 26, 2019

(54) HARDWARE INTEGRITY VERIFICATION

(71) Applicant: SK hynix memory solutions inc., San Jose, CA (US)

(72) Inventor: David J. Pignatelli, Saratoga, CA (US)

(73) Assignee: SK Hynix Memory Solutions Inc., San Jose, CA (US)

( * ) Notice: Subject to any disclaimer, the term of this patent is extended or adjusted under 35 U.S.C. 154(b) by 149 days.

(21) Appl. No.: 13/828,661

(22) Filed: Mar. 14, 2013

(65) Prior Publication Data

US 2014/0089567 A1    Mar. 27, 2014

Related U.S. Application Data

(60) Provisional application No. 61/704,657, filed on Sep. 24, 2012.

(51) Int. Cl.
*G06F 12/02* (2006.01)
*G06F 3/06* (2006.01)

(52) U.S. Cl.
CPC ........ *G06F 12/0246* (2013.01); *G06F 3/0613* (2013.01); *G06F 3/0619* (2013.01); *G06F 3/0656* (2013.01); *G06F 3/0679* (2013.01); *G06F 2212/7208* (2013.01)

(58) Field of Classification Search
CPC ........ G06F 3/06; G06F 3/0619; G06F 3/0679; G06F 11/08; G06F 11/16; G06F 11/167; G06F 11/1666; G06F 12/0246
USPC ........................................ 711/103
See application file for complete search history.

(56) References Cited

U.S. PATENT DOCUMENTS

| 6,076,129 | A | 6/2000 | Fenwick et al. | |
|---|---|---|---|---|
| 8,307,190 | B2* | 11/2012 | Yamada | G06F 13/1668 710/316 |
| 8,583,979 | B1* | 11/2013 | Zeng et al. | 714/752 |
| 8,892,963 | B2* | 11/2014 | Macri et al. | 714/49 |
| 8,977,810 | B2* | 3/2015 | Chiu et al. | 711/105 |
| 2007/0028029 | A1* | 2/2007 | Morein | G06F 13/1615 711/100 |
| 2007/0101182 | A1 | 5/2007 | Takahashi et al. | |
| 2007/0104327 | A1* | 5/2007 | Macri et al. | 380/203 |
| 2008/0162776 | A1* | 7/2008 | Krauss | 711/100 |
| 2009/0077301 | A1 | 3/2009 | Brahmadathan et al. | |

(Continued)

OTHER PUBLICATIONS

Agrawal, N., Prabhakaran, V., Wobber, T., Davis, J.D., Manasse, M., and R. Panigrahy, "Design Tradeoffs for SSD Performance," Proc. USENIX Ann. Technical Conf., 2008.*

(Continued)

*Primary Examiner* — Tracy A Warren
(74) *Attorney, Agent, or Firm* — IP & T Group LLP

(57) ABSTRACT

A flash memory management method and apparatus provides for the separation of the command and data paths so that communication paths may be used more efficiently, taking account of the characteristics of NAND FLASH circuits where the times to read, write and erase data differ substantially. A unique sequence identifier is assigned to a write command and associated data and association of the data and commands are validated prior to writing to the memory by comparing the unique sequence numbers of the data and command prior to executing the command. This comparison is performed after the data and command have traversed the communication paths.

4 Claims, 3 Drawing Sheets

(56) References Cited

U.S. PATENT DOCUMENTS

| | | | |
|---|---|---|---|
| 2009/0106506 A1* | 4/2009 | Skerlj | G06F 12/02 |
| | | | 711/154 |
| 2010/0088434 A1* | 4/2010 | Dang | H04L 1/0083 |
| | | | 710/30 |
| 2010/0169699 A1 | 7/2010 | Fujimoto | |

OTHER PUBLICATIONS

International Search Report and Written Opinion of the International Searching Authority for International Application No. PCT/US2013/060816, dated Jan. 16, 2014, 6 pages.

\* cited by examiner

HARDWARE INTEGRITY VERIFICATION

This application claims the benefit of U.S. 61/704,657, filed on Sep. 24, 2012, which is incorporated herein by reference.

FIELD OF THE INVENTION

This application may relate to the storage of data in a computer memory system.

BACKGROUND

A high performance Flash-based memory system may be designed with a very high degree of parallelism. By employing more parallel execution threads or paths, the overall performance can be very high even if the low-level devices are relatively slow.

An example of a memory system using these concepts is described in U.S. 61/650,604, filed on May 23, 2012, entitled "FLASH MEMORY CONTROLLER", which is commonly owned, and which is incorporated herein by reference.

In such a system, there are numerous hazards to data integrity: for example, coherency corruption. Data path activity may be comprised of hundreds of data segments being dispatched to numerous low-level storage devices, each data segment with a distinct storage command. A small error in such a system can lead to rampant user data loss: a catastrophic failure.

SUMMARY

A data transmission integrity checking scheme is described where each storage command and data block are tagged with a same, but otherwise unique, signature field allowing any subsequent processing function to validate the data storage or retrieval process. The data and the associated command may be transmitted at different times and over different data paths, and the correct association of the command with the data is validated using the tag prior to execution of the command or prior to use of the data.

DESCRIPTION

Figure 1:
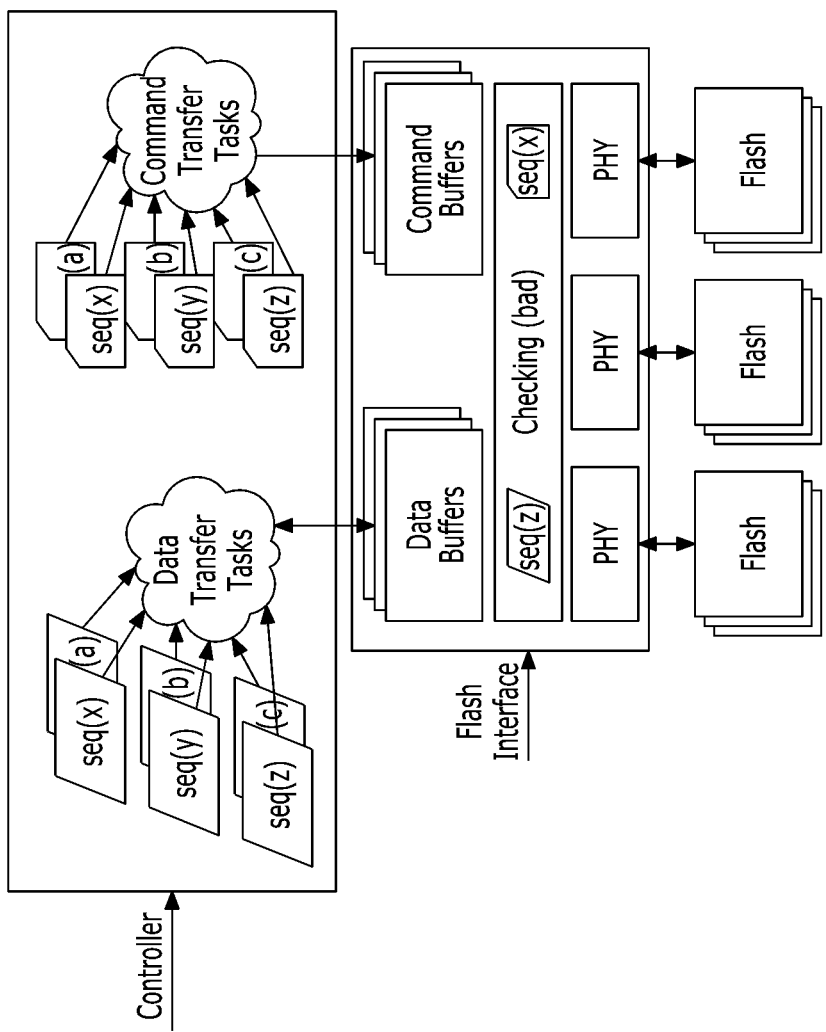
FIG. 1 is a diagram of a distributed data storage system where the data and commands travel over different paths in a system.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g., software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits.

The methods may be provided, at least in part, as a computer program product that may include a non-volatile machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; FLASH memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

To mitigate the effect of a data transmission or sequencing error, low-level integrity checking may be used, whereby a storage data unit and a corresponding command for that storage data unit is includes an integrity checking component. For convenience this component is termed a "header" herein; however, the "header" may be positioned in any predetermined or determinable location with respect to the storage data unit or the command. In the case of writing data to a memory unit, the commands and the data may be transmitted from a memory controller which may be, for example, a RAID controller to memory modules comprising the storage aspect of the memory system. A similar arrangement may be used for the return path when a READ command is issued, for ensuring the integrity of merging sequences of data being read from the memory modules by the RAID controller.

Where the data is stored in a memory module and the command is generated at a memory controller, the data and the command may traverse different physical paths between the memory controller and the memory module. So, depending on the properties of the path that the data takes between the memory controller and the memory module ("the data path") and the path that the corresponding command takes between the memory controller and the memory module ("the command path"), the correspondence between the particular command, which may have an associated physical or logical address for storing the data associated with the command, and the data itself may lose coherence. This may occur for a number of reasons, including hardware failure. But such loss of coherence may also be a consequence of the execution of other functions along the data path or the command path that may interrupt the orderly sequential transmission of the data and the commands.

FIG. 1 shows the separate transmission of data and the corresponding commands associated with subsequent processing of the data from a controller to a FLASH interface (FLI) which may store data or retrieve data from a plurality of FLASH memory circuits, which may be chips. Each of the commands and the associated data may be identified with a specific sequence (e.g., seq(y)) but transmitted over different paths. This transmission approach may be useful in subsuming various operations of the data transmission path (a data bus, for example) and routing functions which may be performed at intermediate points on the data bus, or to permit reordering of the data at the receiving memory module so as to optimize the operation of the memory module when considering the detailed design of the module.

Such optimization may include, for example, accommodating erase operations in one or more of a plurality of FLASH memory circuits comprising the memory module, the interleaving of read and write operations, suppression of multiple consecutive writes to a fixed physical or logical address, or the like. Transmitting the commands and the data by separate paths may result, for example, in the command arriving before the associated data so that such preprocessing operations may be completed prior to the arrival of the data. This may result in a reduced need for temporary storing (buffering) of the data. Such actions may also result in increased efficiency in the use of the internal bandwidth of the memory module.

A command generation module (a controller) may generate commands, each command being tagged with a Sequence number (seq ( )) and PHY channel to which the command is being directed and the commands may be interleaved in time and space to meet up with the corresponding data of the same sequence number prior to the data being written to the storage media. This process may also be used in returning data to the controller from the memory device. If there is a mismatch between the data and an associated command (that is, the sequence numbers seq( )) do not match), either the wrong data or corrupted data would being written or, alternatively, the correct data may be written to the wrong device or location. If such a mismatch is encountered, the memory module may be configured to abort the transfer and alert the controller system. FIG. 1 shows an example of such a bad match, Queued data and commands may be flushed from the buffers, and transactions may be repeated to ensure correctness.

The device may be comprised of separate elements such as a processor (controller), a bus, a FLI, which may comprise another processor and buffer memory and a PHY interface to the FLASH memory circuits, or two or more of the elements may be combined in an ASIC, FPGA or other circuit where a portion of the control of such a circuit is by using a microcode. The PHY may be realized as a state machine or as a general purpose processor.

Figure 2:
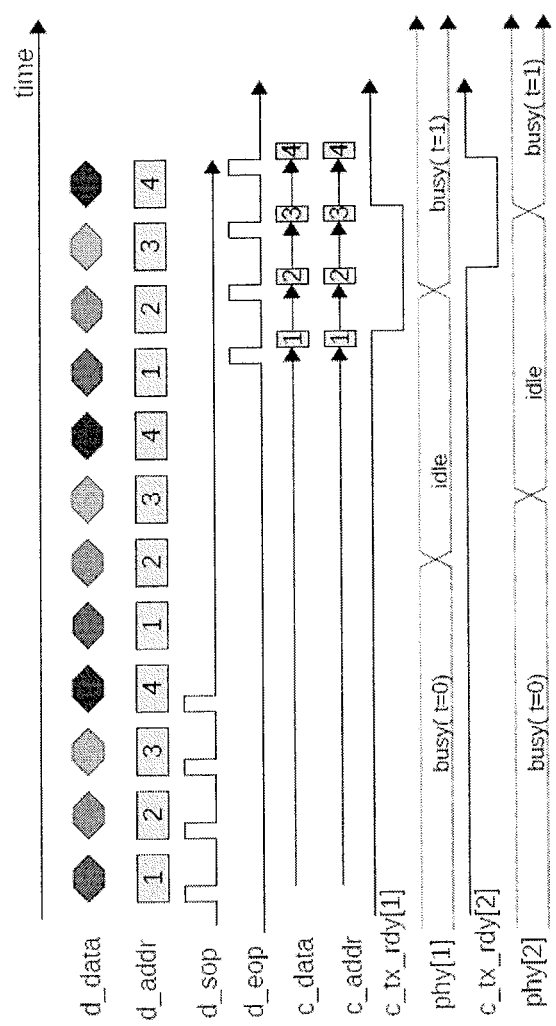
FIG. 2 is an illustration of an example the write command protocol timing.

Write operations to each PHY may occur substantially in parallel and one chunk of data, which may be, for example, a 1 KB portion of a larger data extent, may be deposited into each PHY Tx FIFO (first-in first-out buffer) in a round-robin fashion. FIG. 2 illustrates the timing of operation of four PHYs. The chunk transfers may be interleaved over the bus where each PHY stream may be addressed to a different area of the FLI (FLASH interface) different PHY. The first chunk of each stream may be marked with a SOP (start of page) indication.

In this example, three chunk transfers per channel are shown in FIG. 2. The last chunk of a sequence transmitted on each channel is marked with an EOP. Following the last chunk transfer of each channel, the Flash write command is transmitted over the Command interface (c_data). A FLI Tx Command Ready indicator may be momentarily de-asserted while the command is being processed. The PHY may remain busy while a new command can be transferred, allowing some degree of data and command pipelining. With N channels (PHY) it may be possible to have each channel actively transferring data to a Flash Device, while a new command (with its data) is being prepared for execution.

As shown in FIG. 1, there are data caching operations and flash command operations for each Flash interface, creating a task buffer of activity for the next write event (write window). The task buffer may be in two parts: data, and commands. When the write window starts, a data movement engine may transfer data for all PHYs in parallel; interleaved at approximately the chunk level. When a sufficient number of chunks have been transferred, operational commands are dispatched to each PHY and the cycle repeats. In the FLASH interface (FLI), the data and commands travel over separate paths but are joined prior interacting with a physical FLASH device. The integrity checking is intended to prevent a mishap where the data and command streams for any sequence become skewed or otherwise corrupted. If the data were sent to the wrong PHY at the wrong address, the result would be a loss of data. When mismatches are detected, any data or command issuance to the affected PHY ceases, and a management event is required to flush the pipeline and recover.

Flash reads may be considered as divided into two parts; the actual Flash Read, and the Read Data Transfer. This may be done so that the PHY may access a plurality of die or chips or other memory circuits connected to it and deposit Read commands substantially in parallel. If each Read command were to include performing a return data transfer, then the PHY may not be able to arrange many read access times in parallel. In this example, however, once all of the FLASH die have been activated, the transfer of the read data can commence after a polling operation indicates that requested read data has become available.

Figure 3:
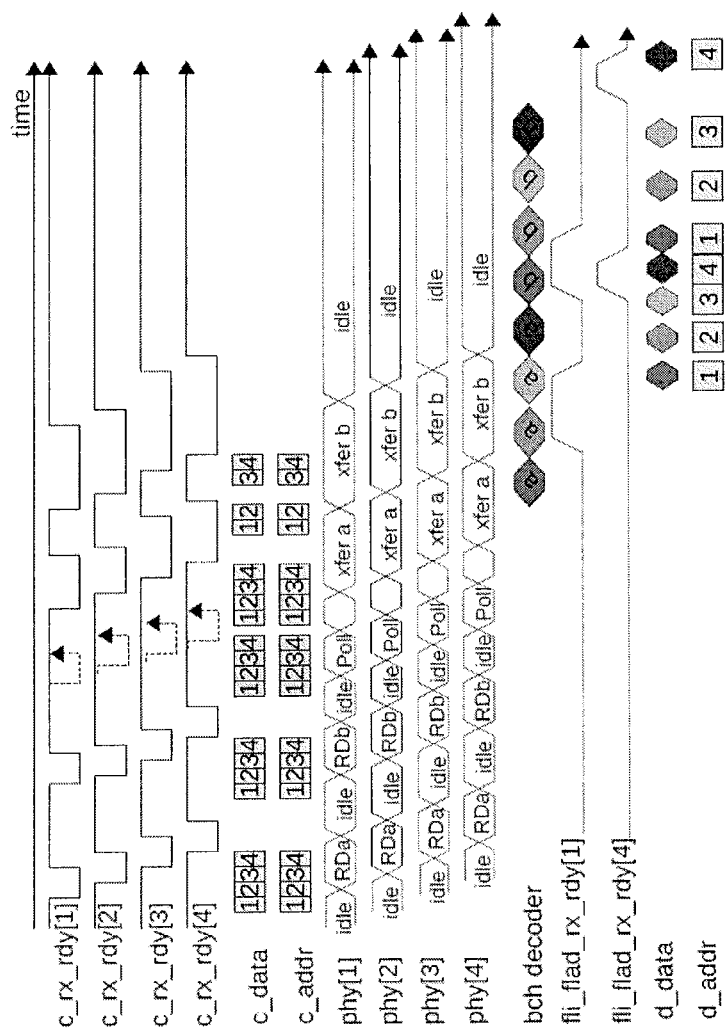
FIG. 3 is an illustration of an example of the read interface command protocol timing.

Referring to FIG. 3, four PHY channels are shown. The command ready signals may be asserted and the FLI may load the Flash Read commands. There can be more than one Flash Read command issued by a PHY interface (for example, two die; a and b, may be accessed by a PHY). There can be a plurality of polling cycles to determine when the read data is available to transfer from the die. Then Read Transfer (Xfer) commands may be issued by the PHY and the data moved across the PHY DQ bus. As the data is read into the controller, and chunks are collected, a BCH context from each Read Command may be inserted into the data stream and the complete chunk is processed through a BCH decoder.

In a read operation, the function of integrity checking may be relaxed but some degree of validity checking may be performed. Each command context may be matched to the physical channel into which it was directed. Further, the incoming FLASH read chunk may be marked with the associated command Sequence number (seq( )) and BCH status results. The header can be used to route the data to the correct read context.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention.

What is claimed is:

1. A system for storing digital data, comprising:
  a controller that is configured to:
    send commands including write commands and write data chunks associated with the write commands, wherein the write commands are tagged with sequence numbers and physical "PHY" channels to which the write commands are directed, and the write data chunks are tagged with a same sequence number as its corresponding write command; and
  a flash interface configured to:
    receive the write commands from the controller via a command path,
    transfer the write commands to the tagged PHY channels,
    receive, at a time different from when the write commands are received, the write data chunks from the controller via a data path between the controller and the flash interface which is different from the command path, and,
    match by tagged sequence number, the write commands with the write data chunks associated with the write commands,
    when the sequence numbers tagged to the write commands and write data chunks are matched, transfer the write data chunks to the tagged PHY channels via a data path between the flash interface and the PHY channels, and
    when the sequence numbers tagged to the commands and data chunks are mismatched, the flash interface is further configured to abort the transfer of the write commands and the write data.

2. A method for storing digital data, comprising:
  sending, from a controller to a flash interface, commands including write commands and write data chunks associated with the write commands, wherein the write commands are tagged with sequence numbers and physical "PHY" channels to which the write commands are directed, and the write data chunks are tagged with a same sequence number as its corresponding write command,
  receiving, by the flash interface, the write commands from the controller via a command path,
  transferring the write commands to the tagged PHY channels,
  receiving, at a time different from when the write commands are received, by the flash interface, the write data chunks from the controller via a data path between the controller and the flash interface which is different from the command path;
  matching, by tagged sequence number at the flash interface, the write commands with the write data chunks associated with the write commands,
  when the sequence numbers tagged to the write commands and write data chunks are matched, transferring the write data chunks to the tagged PHY channels via a data path between the flash interface and the PHY channels, wherein the command path and the data path are different physical paths, and
  when the sequence numbers tagged to the write commands and the write data chunks are mismatched, aborting the transfer of the write commands and the write data by the flash interface.

3. A computer program product for storing digital data, the computer program product being embodied in a non-transitory computer readable storage medium and comprising computer instructions for:
  sending, from a controller to a flash interface, commands including write commands and write data chunks associated with the write commands, wherein the write commands are tagged with sequence numbers and physical "PHY" channels to which the write commands are directed, and the write data chunks are tagged with a same sequence number as the corresponding command;
  receiving, at the flash interface, the write commands from the controller via a command path;
  transferring the commands to the tagged PHY channels,
  receive, at a time different from when the write commands are received, the write data chunks from the controller via a data path between the controller and the flash interface which is different from the command path,
  matching, by tagged sequence numbers at the flash interface, the write commands with the write data chunks associated with the write commands,
  when the sequence numbers tagged to the write commands and the write data chunks are matched, transferring the write data chunks to the tagged PHY channels via a data path between the flash interface and the PHY channels, wherein the command path and the data path are different physical paths, and
  when the sequence numbers tagged to the write commands and the write data chunks are mismatched, aborting the transfer of the write commands and the write data by the flash interface.

4. A system for storing digital data, comprising:
  a controller that is configured to:
    send commands including read commands and receive read data chunks associated with the read commands,
    wherein the read commands are tagged with sequence numbers and physical "PHY" channels to which the read commands are directed; and
  a flash interface configured to:
    receive the read commands from the controller via a command path,
    transfer the read commands to the PHY channels to which the read commands are directed,
    receive the read data chunks associated with the read commands from the PHY channels at a time different from when the read command was received, and tag the received read data chunks with a same sequence number as its corresponding read command, transfer the tagged read data chunks to the controller via a data path between the controller and the flash interface which is different from the command path, wherein the controller is further configured to match by tagged sequence number, the read commands with the read data chunks associated with the read commands, when the sequence numbers tagged to the read commands and read data chunks are mismatched, to abort the transfer of the read data chunks.

* * * * *